United States Patent [19]

Meinertz

[11] Patent Number: 5,093,605
[45] Date of Patent: Mar. 3, 1992

[54] POWER REGULATION DURING START UP AND SHUT DOWN

[75] Inventor: Friedrich Meinertz, Singapore, Senegal

[73] Assignee: Thomson Consumer Electronics, S.A., Paris, France

[21] Appl. No.: 621,467

[22] Filed: Dec. 3, 1990

[30] Foreign Application Priority Data

Dec. 22, 1989 [GB] United Kingdom ............... 8929129

[51] Int. Cl.[5] ........................ H01J 29/74; H04N 5/63
[52] U.S. Cl. .................................. 315/411; 358/190
[58] Field of Search ............... 315/408, 411; 358/190

[56] References Cited

U.S. PATENT DOCUMENTS 5,013,980  5/1991  Stephens et al. ................ 315/411

*Primary Examiner*—Gregory C. Issing
*Attorney, Agent, or Firm*—Joseph S. Tripoli; Joseph J. Laks; Harvey D. Fried

[57] ABSTRACT

A switched mode power supply and horizontal deflection system comprises a first oscillator circuit for generating horizontal rate synchronizing trigger pulses, having a voltage supply input terminal; a horizontal output stage; and, a second oscillator circuit for driving the output stage, operable at a horizontal rate responsive to the trigger pulses and free running at a different rate absent the trigger pulses. An overcurrent protection circuit for the horizontal output stage responds to an overcurrent condition which can occur during free running of the second oscillator circuit. A flyback transformer is coupled to the horizontal output stage and has a secondary side voltage supply coupled to the voltage supply input terminal for energizing the first oscillator circuit during operation of the output stage. An energy storage device, for example a large value capacitor, is coupled to the voltage supply input terminal for energizing the first oscillator circuit for a period of time after the horizontal deflection system is deactivated. The capacitor and a resistor form a timing network for the first oscillator circuit. The first oscillator circuit continues generating synchronizing trigger pulses and prevents operation of the second oscillator circuit at the free running frequency. A quick charging path for the energy storage device, for example a Zener diode in parallel with the resistor, minimizes operating time of the second oscillator circuit at the free running rate prior to the initiation of the synchronizing trigger pulses when the power supply and horizontal deflection system is activated.

33 Claims, 6 Drawing Sheets

POWER REGULATION DURING START UP AND SHUT DOWN

This invention relates to the field of switched mode power supplies for television apparatus, and in particular, to a control circuit for preventing overcurrent operation by the horizontal output stage in a horizontal deflection system when the television apparatus is turned on or off.

Televisions with microprocessor control typically have certain circuits which are continuously active in a standby mode of operation, even when the television has been switched off. Other circuits are energized only after the television set has been switched on, in a run mode of operation. Problems can be encountered coordinating the interaction of systems which are always active and those which are active only during the run mode of operation.

The horizontal output stage in a horizontal deflection system may comprise a horizontal output transistor driven by a sawtooth waveform oscillator. A configuration for one such output circuit known as a Wessel circuit is shown in accompanying drawings. A sawtooth oscillator generates the basic driving waveform, and is typically free running at a lower frequency than the horizontal scanning frequency. For an NTSC interlaced signal, the horizontal scanning frequency is approximately 15,750 Hz. The free running frequency might be between 13,000 Hz and 14,000 Hz.

A horizontal oscillator is provided for generating a synchronizing timing signal precisely at the horizontal scanning rate, synchronized with the video input signal. Such a horizontal oscillator may be incorporated as one the circuits in a one-chip. Such a one-chip may be part No. M51408 available from Mitsubishi. The horizontal oscillator circuit provides trigger pulses to the otherwise free running oscillator, to assure that the sawtooth waveform is precisely equal to the horizontal scanning frequency rather than the free running frequency. The sawtooth signal may be coupled through buffer and driver stages, to the horizontal output stage, which may be a horizontal output transistor. The horizontal output transistor is coupled to a flyback transformer, from which a number secondary voltage sources may be derived from energy in the flyback pulses. Rectifying circuits may be coupled to secondary windings of the flyback transformer for developing these voltage sources at different voltage levels which may be required by various load circuits in the television.

Typically, neither the sawtooth waveform oscillator nor the one-chip are energized during the standby operation. In fact, the one-chip is typically energized by one or more secondary voltage sources generated by the switched mode operation of the power supply. Moreover, the switched mode power supply, which relies upon switching of a horizontal output transistor to develop the secondary derived voltage sources, cannot operate until the sawtooth waveform has been generated by the sawtooth oscillator.

It can be a characteristic of such switched mode power supplies that sufficiently prolonged operation at the free running frequency results in the horizontal output transistor being conductive for too long a period of time, at each turn-on. This results in an overcurrent condition, which can damage the horizontal output transistor and other components in the switched mode power supply. Accordingly, a safety circuit is often provided for sensing the overcurrent condition and disabling the power supply. The safety circuit can be responsive to overcurrent or overvoltage conditions having other causes as well.

Televisions with microprocessor control are programmed to undergo a certain sequence of operations when the television is switched off, in order to prevent undesirable or harmful transient conditions. In a switched mode power supply for a horizontal deflection system as described above, such an undesirable transient condition can occur when the television set is switched off. The horizontal oscillator in the one-chip providing the horizontal rate trigger pulses for the sawtooth oscillator can stop functioning before the sawtooth oscillator stops functioning. This sudden change of horizontal frequency as the sawtooth oscillator begins free running causes a large current spike to be conducted by the horizontal output transistor, which in turn causes operation of the safety circuit, disrupting the orderly, soft switch off of the television.

The horizontal oscillator in the one-chip has a separate Vcc input terminal, which is coupled to derived secondary voltage source of the flyback transformer. The Vcc input pin of the chip requires a series resistor for frequency control and a capacitor for filtering out ripple. In accordance with an inventive arrangement, soft switch off can be assured by substantially increasing the capacitance value of the filtering capacitor, for example to 1,000 microfarads. This ensures that the horizontal synchronizing trigger pulses will continue to be generated long enough to maintain the horizontal frequency oscillation of the sawtooth oscillator until the soft switch off has been completed.

Although the introduction of large capacitance filter capacitor solves the soft switch off problem, a further problem can remain. The value of the filter capacitor increases the R-C time constant at the Vcc input pin of the one-chip. Whenever the television is switched on, the filter capacitor can require so much time to charge that the sawtooth oscillator free runs long enough at the lower frequency to cause the overcurrent condition, which causes activation of the safety sense circuit, which interrupts operation of the switched mode power supply. In effect, the safety circuit can prevent the television from ever being successfully turned on. It is necessary to significantly decrease the start up time for the horizontal oscillator in the one-chip, without the sacrificing the filtering function of the R-C network and without sacrificing reliable soft switch off. In accordance with another inventive arrangement, a Zener diode can be coupled in parallel with the resistor and bypass the resistor during startup of the television, providing a quick charging path for the capacitor. The Zener diode stops conducting as soon as the operating voltage is reached, enabling the R-C network to provide ripple filtering as before. The quick charging path reduces the time during which the sawtooth oscillator operates at the free running frequency, and prevents the overcurrent condition of the horizontal output transistor.

A switched mode power supply and horizontal deflection system according to inventive arrangements taught herein assures reliable and soft turn on and off. A power supply and deflection system in accordance with these inventive arrangements can comprise a first oscillator circuit for generating horizontal rate synchronizing trigger pulses, having a voltage supply input terminal; a horizontal output stage; and, a second oscillator circuit for driving the output stage, operable at a horizontal rate responsive to the trigger pulses and free running at a different rate absent the trigger pulses. An overcurrent protection circuit for the horizontal output stage responds to an overcurrent condition which can occur during free running of the second oscillator circuit. A flyback transformer is coupled to the horizontal output stage and has a secondary side voltage supply coupled to the voltage supply input terminal for energizing the first oscillator circuit during operation of the output stage. An energy storage device, for example a large value capacitor, is coupled to the voltage supply input terminal for energizing the first oscillator circuit for a period of time after the horizontal deflection system is deactivated. The first oscillator continues generating synchronizing trigger pulses and prevents operation of the second oscillator at the free running frequency. A quick charging path is established for the energy storage device, for example by a Zener diode coupled in parallel with the resistor. The quick charging path minimizes operating time of the second oscillator at the free running rate prior to the initiation of the synchronizing trigger pulses when the power supply and horizontal deflection system is activated.

Figure 1:
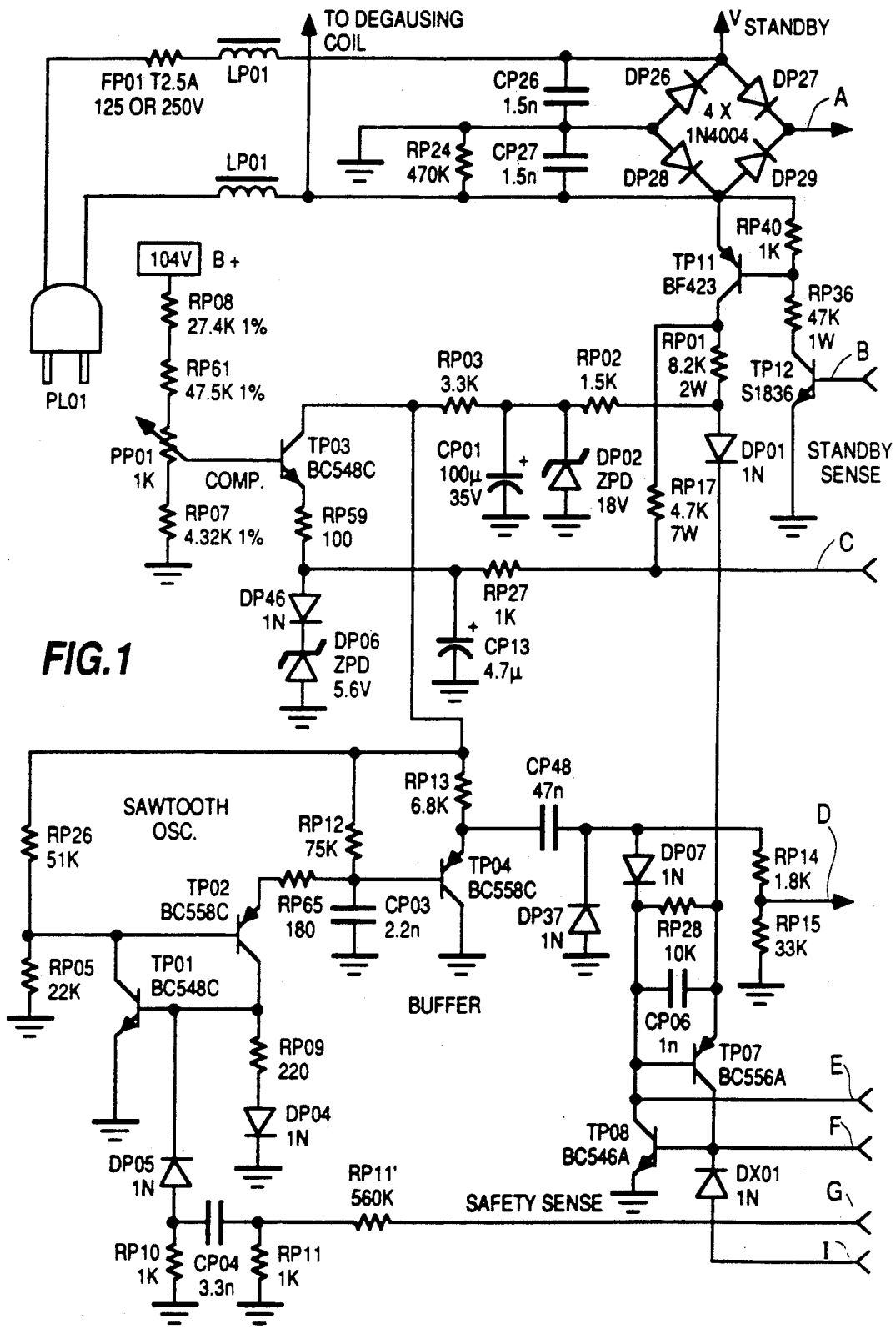
FIGS. 1-4 are a composite schematic of a switched mode power supply, employing a Wessel circuit, for a television apparatus according to an inventive arrangement.

In the drawings, all capacitances are in farads and EC equals 16 volts unless otherwise noted. All resistances are in ohms, ¼ watt, unless otherwise noted.

In FIG. 1, an AC mains supply is coupled to a diode bridge comprising diodes DP26, DP27, DP28 and DP29. Half wave rectified voltage is available as VSTANDBY, which is the source for power during the standby mode of operation. The standby voltage is an input to a voltage regulator, for example a series pass regulator, which supplies standby voltage to a microprocessor, not shown. The microprocessor is responsive to on-off and other control commands.

Transistor TP11 acts as a gate for the remaining half wave rectified pulses from the diode bridge. Transistor TP11 is responsive to operation of switch transistor TP12. The base of switch transistor TP12 is coupled to a STANDBY line (FIG. 2) from the microprocessor. The STANDBY line goes high, turning transistor TP12 on, whenever the microprocessor initiates the run mode of operation. Half wave rectified pulses gated by TP11 provide energy for charging capacitor CP01 up to 18 volts as determined by Zener diode DP02. The 18 volt voltage level provides a bias voltage at the junction of a voltage divider formed by resistors RP26 and RP05. The half wave rectified pulses are also an input to a sawtooth waveform oscillator, generally comprising transistors TP01, TP02 and capacitor CP03. Transistors TP01 and TP02 are normally biased off. When capacitor CP03 is sufficiently charged, transistor TP02 turns on. This provides base drive for transistor TP01 which also turns on. This provides a rapid discharge path for capacitor CP03. When capacitor CP03 is fully discharged, transistors TP02 and TP01 turn off, enabling capacitor TP03 to recharge. The sequence repeats cyclically. The resulting waveform is a sawtooth at the base of transistor TP04. In a free running mode, absent trigger or synchronizing pulses delivered to the base of transistor TP01 through diode DP05, the sawtooth oscillator free runs at a frequency less than a standard horizontal scanning frequency. For the component values shown, the free running frequency is between 13,000 Hz and 14,000 Hz.

Figure 2:
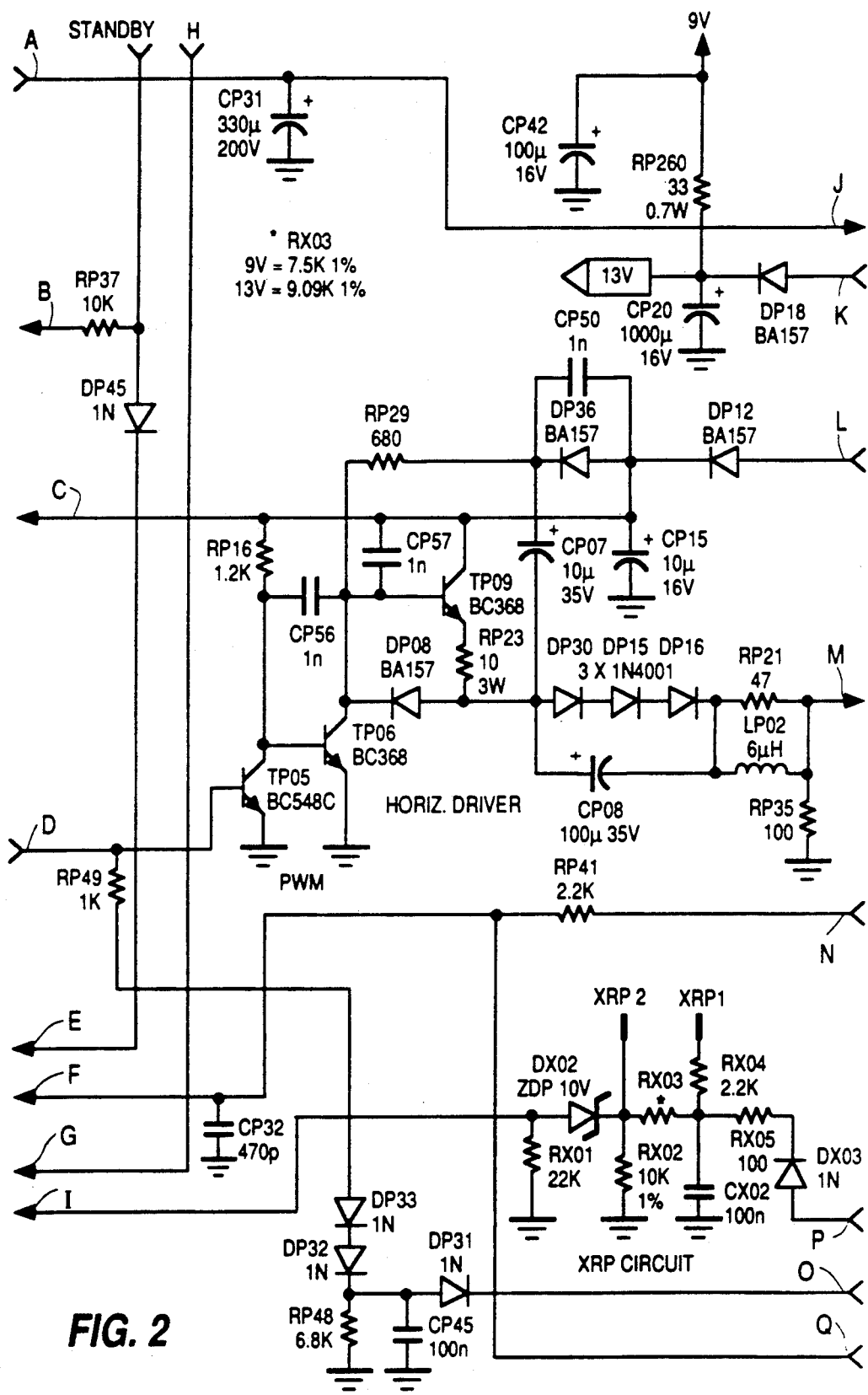

The sawtooth waveform is conducted through buffer transistor TP04 and AC coupled to the pulse width modulating (PWM) transistor TP05 (FIG. 2) through capacitor CP48. The signal is clamped by diode DP37 and adjusted in amplitude by the voltage divider formed by resistors RP14 and RP15. With further reference to FIG. 2, the conduction time of PWM transistor TP05 is related to slope of the leading edge of the sawtooth waveform. The on/off pulse width modulating signal at the collector of transistor TP05 is coupled through the horizontal driver circuit to the horizontal output stage, shown at the upper left hand portion of FIG. 4. In the configuration of a Wessel circuit, the horizontal output stage is essentially horizontal output transistor TP10. Horizontal output transistor TP10 drives both the power supply transformer and the flyback transformer. Briefly, the output stage transistor in a Wessel circuit operates with an unstabilized supply voltage, and draws from the operating voltage source only as much power is required to maintain a constant deflection current. The conduction time of the horizontal output transistor is regulated to maintain constant deflection current independently of fluctuations of operating voltage and real loads.

Figure 4:
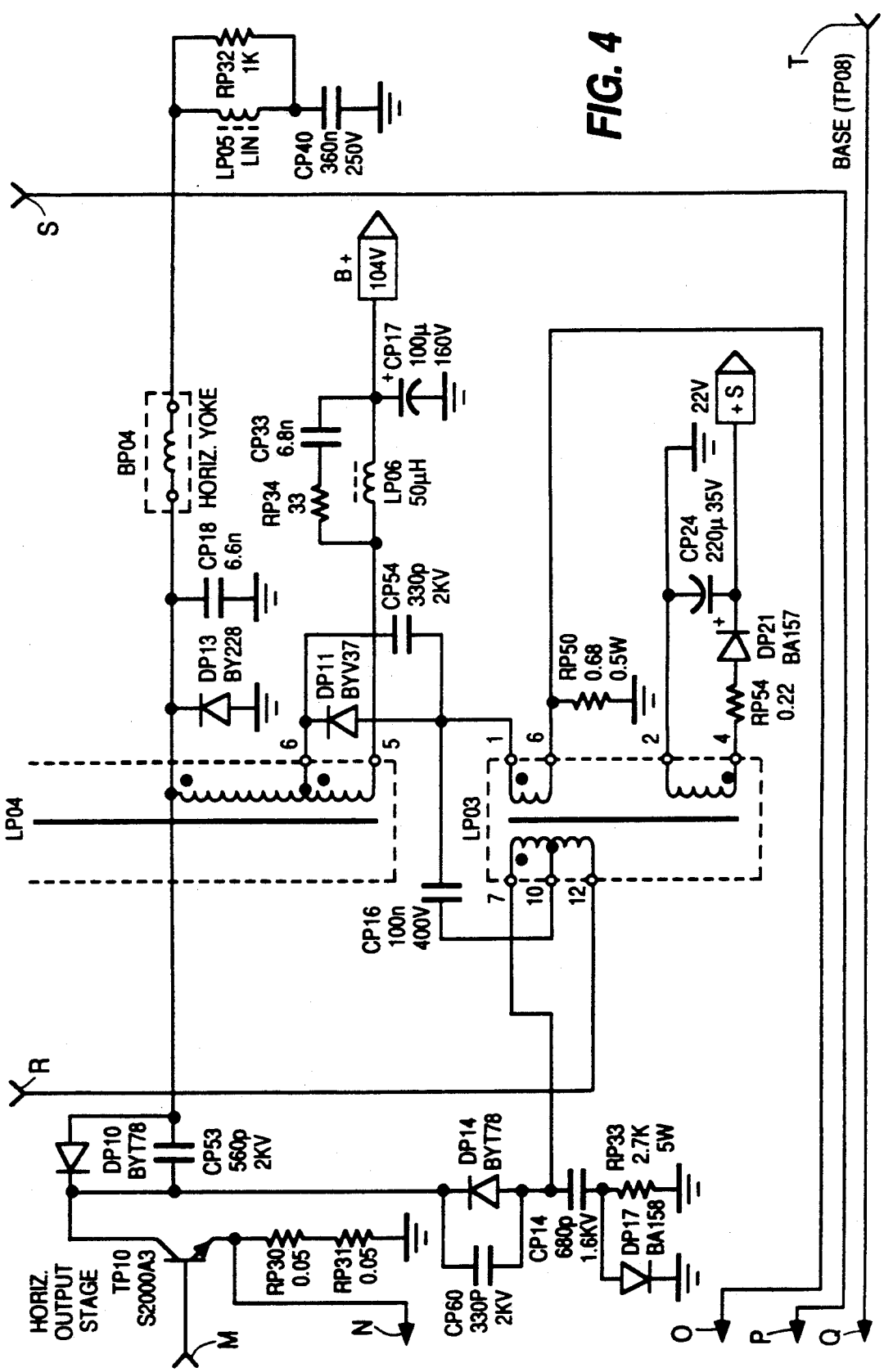

Transistor TP10 is coupled to the horizontal yoke BP04, the flyback transformer LP04 and the power supply transformer LP03, as shown in FIG. 4. Raw B+ voltage originating at the diode bridge rectifier circuit in FIG. 1 is coupled to tap 12 of transformer LP03. The raw B+ voltage is applied across the primary winding of transformer LP03 by the switching transistor TP10. The deflection winding of transformer LP04, retrace capacitor CP18 and damper diode DP13 are coupled across the collector to emitter junction of the switching transistor TP10 by a first diode DP10, poled for conduction in the same direction as the collector to emitter junction. A secondary winding of transformer LP03 is coupled across the deflection winding by a second diode DP11 poled to conduct and transfer energy from the primary winding to the deflection winding during the retrace interval. The first half of the retrace interval is the time during which the retrace capacitor CP18 is charged by energy in the retrace pulse flowing from the horizontal yoke. The retrace capacitor is fully charged at the middle of retrace, when the deflection current is zero. Current flows from the retrace capacitor back through the horizontal yoke during the second half of retrace, charging the linearity capacitor CP40. Retrace ends when the voltage across the retrace capacitor CP18 reaches zero, and the damper diode conducts. The damper diode conducts until the deflection current reaches zero. Thereafter, the damper diode turns off. Transistor TP10 will start conducting sometime before the deflection current reaches zero, but not after, depending upon the extent of load losses. As the deflection current exceeds zero, the diode DP10 becomes forward biased by reason of the charge on the linearity capacitor. This is possible because transistor TP10 will already be conducting for the power supply function, and the cathode of diode DP10 will be only slightly above ground. The start of conduction by transistor TP10 will not effect the deflection current, whereby regulation of the power supply function is independent of deflection. Conduction of the deflection current through diode DP10 and transistor TP10 continues until transistor TP10 is turned off, which initiates retrace.

There are two safety sense circuits associated with operation of the transistor TP10. Emitter current is directly sensed by sampling resistors RP30 and RP31. The voltage across the sampling resistors is an input to the base of transistor TP08 (FIG. 1), which forms part of the safety sense circuit described in detail below. Current in the secondary winding of transformer LP03 is sampled by resistor RP50. The voltage across resistor RP50 is an input to a network of diodes DP31, DP31 and DP33, resistor RP48 and capacitor CP45. If the sampled voltage is of sufficient magnitude, the DC level of the sawtooth signal on the base of PWM transistor TP05 will be pulled down. This will reduce the conduction time of the PWM transistor, which will reduce the conduction time of transistor TP10. This can protect against overcurrent conditions which might be reflected back through the transformer LP03 and otherwise cause damage before being sensed as emitter current of transistor TP10 by resistors RP30 and RP31.

Figure 3:
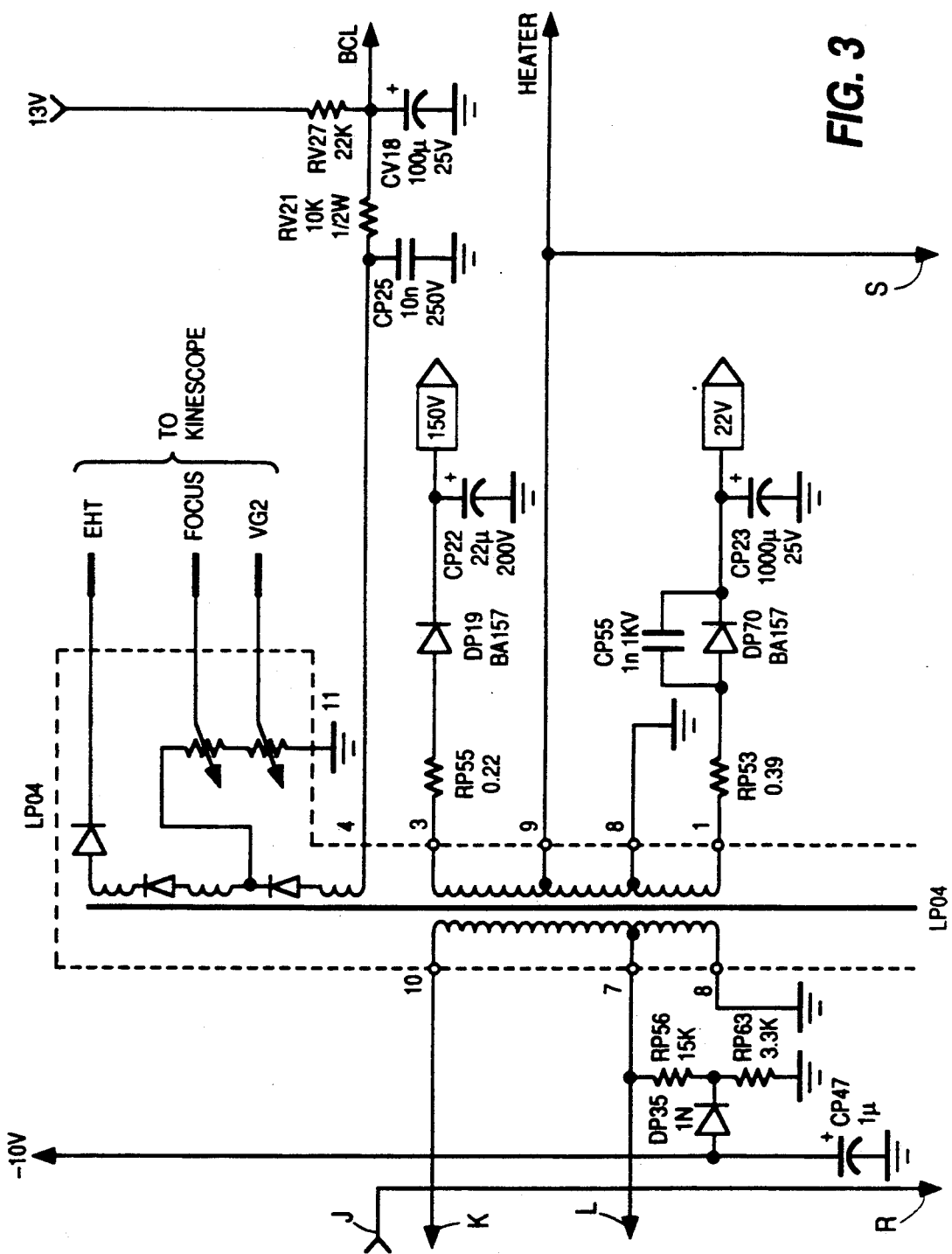

Switched mode operation of the horizontal output transistor enables a number of secondary voltage sources coupled to secondary windings of the flyback transformer to be developed. One of these voltages is the B+ voltage of 104 volts, which is fed back to resistor RP08 in FIG. 1 as the principle feedback signal for regulation of the switched mode power supply. Another secondary supply shown in FIG. 3 is a 13 volt supply developed by capacitor CP20 and diode DP18 coupled to pin 10 of transformer LP04. This 13 volt secondary supply is the voltage source for the horizontal oscillator circuit of the one-chip shown in FIG. 5. When the 13 volt supply is running, the horizontal oscillator circuit provides output pulses on pin 20 of the one-chip precisely at a standard horizontal scanning rate, synchronized with the video signal input. These pulses trigger the sawtooth oscillator circuit at the base of transistor TP01, assuring that the sawtooth oscillator operates synchronously, at the standard horizontal scanning frequency. Yet another secondary supply is a 22 volt supply developed by capacitor CP23 and diode DP20 for energizing the vertical deflection driver integrated circuit shown in FIG. 6.

Operation of the sawtooth oscillator in the free running mode is independent of operation of the horizontal oscillator in the one-chip, energized by the 13 volt supply. In fact, the sawtooth oscillator will operate in the free running mode before the 13 volt secondary supply becomes available, whenever the television is switched on. Moreover, the free running oscillator is apt to continue free running even when the switched mode power supply has ceased operation, when the television is switched off. The on-time of the horizontal output transistor is increased during the free running operation of the sawtooth oscillator. The transition from synchronized to free running is an abrupt transition occurring as soon as the synchronizing trigger pulses stop. The sawtooth oscillator can continue operating in the free running mode for long a enough period of time after the horizontal oscillator in the one-chip stops generating synchronizing pulses, for the horizontal output transistor to operate in a overcurrent condition.

Overcurrent conditions are detected by sense resistors RP30 and RP31, connected to the emitter of transistor TP10. When the sense voltage is of sufficient magnitude, transistor TP08 in FIG. 1 will be turned on. Conduction of transistor TP08 turns on transistor TP07. Together, transistor TP07 and TP08 function in the manner of a silicon controlled rectifier. When transistor TP08 begins conducting, its collector pulls down the STANDBY control line through diode DP45, which turns off transistor TP12. This in turn turns off gate transistor TP11, which prevents further charging pulses for capacitor CP03. At the same time, a rapid discharge path for capacitor CP01 is provided through diode DP01. This quickly prevents further operation of the horizontal output transistor TP10 by turning off the sawtooth oscillator and effectively grounding the input to PWM transistor TP05. When all of the relevant capacitors have discharged, both the base and emitter of transistor TP07 will be at a voltage level of approximately 2 diode drops below ground. This will turn off transistor TP07, and thereafter, will turn off transistor TP08. This will enable the STANDBY control line to go high again and will initiate operation of the sawtooth oscillator, and thereafter, the horizontal output transistor. Operation of this overcurrent protection circuit is of course desirable responsive to genuine overcurrent conditions. However, overcurrent conditions should not be generated merely because the television set is turned on or off.

The safety sense circuit can also be activated responsive to other fault conditions. The x-ray protection (XRP) circuit shown in FIG. 2 is responsive to overvoltage conditions in the high voltage supply for the cathode ray tube through diode DX03. The output of the x-ray protection circuit is another input to the base of transistor TP08 and the collector of transistor TP07, through diode DX01. The x-ray protection circuit formed integrally with the one-chip is permanently disabled by grounding pin 15. Overcurrent conditions in the vertical yoke (FIG. 6), for example those resulting from a short circuit of S-shaping capacitor CF01, will generate a threshold voltage across resistor RF11. This signal is also coupled to the base of transistor TP08, through diode DF01. The vertical yoke overcurrent signal is tapped from the AC component of the vertical feedback (VFB) signal at potentiometer PF01. The DC component of the vertical feedback signal is developed by the resistive divider comprising resistors RF03, RF04 and RF05. The inventive arrangements taught herein do not interfere with the normal operation of the safety circuit.

Figure 5:
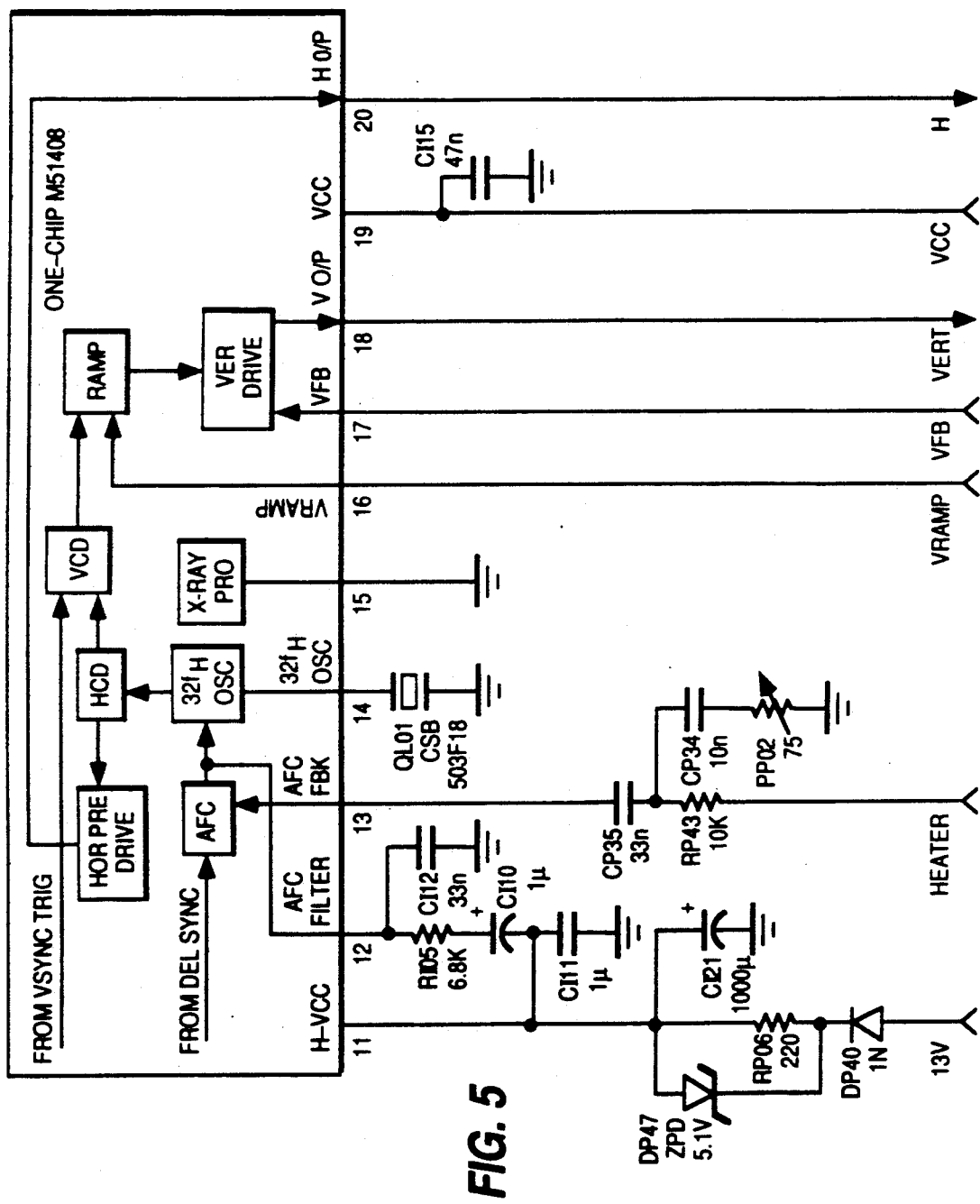
FIG. 5 is a schematic of the horizontal oscillator and vertical oscillator of the one-chip for the television apparatus shown in FIGS. 1-4.
Figure 6:
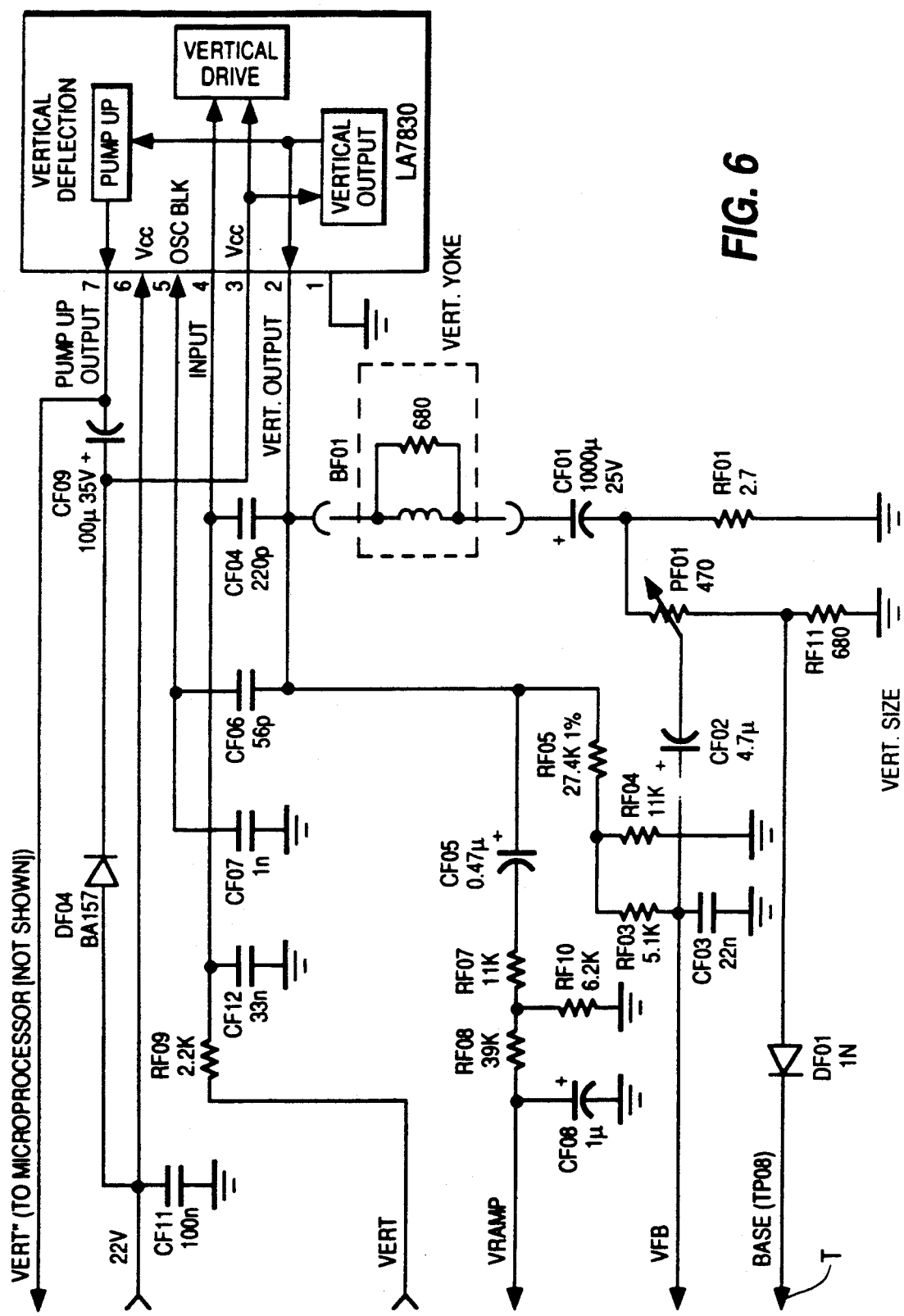
FIG. 6 is a schematic of the vertical drive circuit for the television apparatus shown in FIGS. 1-5.

Accordingly, an inventive arrangement assures that the horizontal oscillator in the one-chip will continue operating long enough to maintain operation of the sawtooth oscillator at the horizontal scanning rate until the soft shut down of the television has been accomplished. This is achieved by substantially increasing the size of capacitor C121 as shown in FIG. 5 to 1,000 microfarads. This provides a continuing energy source for the horizontal oscillator. However, capacitor C121 requires a long charging time. When the television is turned on, this charging time is sufficiently long that the sawtooth oscillator operates in at the free running frequency long enough to cause an overcurrent condition in the horizontal output transistor, which trips the safety sense circuit. It may be impossible to turn on the television, as the safety sense circuit keeps turning the power supply off. This problem is solved in accordance with an inventive arrangement by providing a quick charging path for capacitor C121. The quick charging path is advantageously provided by Zener diode DP47, coupled in parallel to resistor RP06. Resistor RP06 and capacitor C121 provide filtering against ripple for the horizontal oscillator circuit in the one-chip. The Zener diode provides a short-circuit path around resistor RP06 when the television is turned on. This enables the horizontal oscillator circuit in the one-chip to begin operating soon enough to synchronize the sawtooth oscillator before the horizontal output transistor reaches an overcurrent condition.

Other inventive arrangements may be appreciated by an analysis of the remaining parts of the circuit schematic, which have not been described in detail.

What is claimed is:

1. A power supply and horizontal deflection system, comprising:
   a horizontal output stage;
   oscillating means for driving said horizontal output stage, operable at a controllable rate responsive to trigger pulses and free running at a different rate absent said trigger pulses;
   means for generating said trigger pulses;
   means operable with said horizontal output stage for energizing said means for generating said trigger pulses;
   energy storage means for energizing said means for generating said trigger pulses for a period of time after said horizontal output stage is deactivated; and,
   means for charging said energy storage means for a period of time after said horizontal output stage is activated.

2. The system of claim 1, wherein said energy storage means comprises a capacitor.

3. The system of claim 1, wherein said means for charging said energy storage means comprises a Zener diode.

4. The system of claim 1, comprising a capacitor and a resistor defining a timing network for said means for generating said trigger pulses, said capacitor forming said energy storage means.

5. The system of claim 4, wherein said means for charging said energy storage means comprises a Zener diode in parallel with said resistor.

6. The system of claim 1, further comprising means for inhibiting operation of said oscillating means and said horizontal output stage responsive to an abnormal current condition in said horizontal output stage.

7. The system of claim 1, comprising a standby power circuit for energizing said oscillating means independently of said operation of said horizontal output stage.

8. The system of claim 1, wherein said means operable with said horizontal output stage for energizing said means for generating said trigger pulses comprises a flyback transformer coupled to said horizontal output stage and rectifying means for developing a derived secondary side voltage source.

9. The system of claim 8, comprising a standby power circuit for energizing said oscillating means independently of said operation of said derived secondary side voltage source.

10. The system of claim 9, wherein said means for generating said trigger pulses comprises a voltage supply input terminal coupled to said derived secondary side voltage source, said energy storage means and said means for charging said energy storage means.

11. The system of claim 10, comprising a capacitor and a resistor together defining a timing network for said means for generating said trigger pulses, said capacitor forming said energy storage means.

12. The system of claim 11, wherein said means for charging said energy storage means comprises a Zener diode in parallel with said resistor.

13. The system of claim 1, wherein said means for generating said trigger pulses comprises second oscillating means synchronized with a horizontal synchronizing component in a video signal.

14. A power supply and horizontal deflection system, comprising:
   a horizontal output stage;
   first oscillating means for driving said horizontal output stage, operable at a controllable rate responsive to trigger pulses and free running at a different rate absent said trigger pulses;
   second oscillating means synchronized with a horizontal synchronizing component in a video signal for generating said trigger pulses, said second oscillating means forming a subcircuit of an integrated circuit, but having a voltage supply terminal independent of other subcircuits of said integrated circuit;
   means operable with said horizontal output stage for energizing said second oscillating means;
   energy storage means for energizing said second oscillating means for a period of time after said horizontal output stage is deactivated; and,
   means defining a charging path for said energy storage means, operable for a period of time after said horizontal output stage is activated.

15. The system of claim 14, wherein said integrated circuit is a television one-chip.

16. A power supply and horizontal deflection system, comprising:
   a horizontal output stage, having means for generating a derived secondary side voltage source;
   first oscillating means for generating trigger pulses at a horizontal rate, energized by said secondary side voltage source;
   second oscillating means for driving said output stage at said horizontal rate responsive to said trigger pulses, said second oscillating means free running at a different rate absent said trigger pulses and being energized independently of said horizontal output stage;
   means operable during part of both activation and deactivation of said horizontal output stage for preventing said free running of said second oscillating means.

17. The system of claim 16, wherein said means for preventing said free running of said second oscillating means comprises:
   energy storage means for energizing said second oscillating means for a period of time after said horizontal output stage is deactivated; and,
   means operable for a period of time after said horizontal output stage is activated for charging said energy storage means.

18. The system of claim 16, wherein:
   said energy storage means is charged at a first charging rate by operation of said derived secondary voltage source; and,
   said means operable for a period of time after said derived secondary side supply is activated for charging said energy storage means supplies energy at an accelerated rate relative to said first charging rate.

19. The system of claim 17, wherein said energy storage means comprises a capacitor and said means for charging said energy storage means comprises a Zener diode.

20. The system of claim 19, further comprising a resistor, said resistor and said capacitor forming a timing network for said first oscillating means, said Zener diode being coupled in parallel with said resistor.

21. The power supply of claim 16, further comprising means for disabling said power supply responsive to detection of a current condition which can occur during said free running of said second oscillating means.

22. A power supply and horizontal deflection system, comprising:
   a horizontal output stage;
   oscillating means for driving said output stage, operable at a controllable rate responsive to trigger pulses and free running at a different rate absent said trigger pulses;
   means for generating said trigger pulses;
   means for storing energy;
   means for transferring energy from said horizontal output stage for energizing said means for generating said trigger pulses and for charging said means for storing energy, said energy storage means energizing said means for generating said trigger pulses for a period of time after said horizontal output stage is deactivated; and,
   alternate means for transferring energy from said horizontal output stage to said energy storage means for a period of time after said horizontal output stage is activated.

23. The system of claim 22, wherein said energy storage means comprises a capacitor.

24. The system of claims 22, wherein said alternate means for transferring energy to said energy storing means comprises a Zener diode.

25. The system of claim 22, comprising a capacitor and a resistor defining a timing network for said means for generating said trigger pulses, said capacitor forming said energy storage means.

26. The system of claim 25, wherein said alternate means for transferring energy to said energy storing means comprises a Zener diode in parallel with said resistor.

27. The system of claim 22, further comprising means for inhibiting operation of said oscillating means and said horizontal output stage responsive to an abnormal current condition in said horizontal output stage.

28. The system of claim 22, comprising a standby power circuit for energizing said oscillating means apart from operation of said horizontal output stage.

29. A power supply and horizontal deflection system, comprising:
   a horizontal output stage;
   oscillating means for supplying switching pulses to said horizontal output stage, operable at a controllable rate responsive to trigger pulses and free running at a different rate absent said trigger pulses;
   means for generating said trigger pulses;
   means operable with said horizontal output stage for energizing said means for generating said trigger pulses;
   energy storage means for energizing said means for generating said trigger pulses for a period of time after said horizontal output stage is deactivated; and,
   means defining a charging path for said energy storage means for a period of time after said horizontal output stage is activated.

30. The power supply of claim 29, further comprising means for disabling said power supply responsive to detection of a current condition which can occur during said free running of said oscillating means.

31. A power supply and horizontal deflection system, comprising:
   a horizontal output stage;
   oscillating means for driving said output stage, operable at a controllable rate responsive to trigger pulses and free running at a different rate absent said trigger pulses;
   means for generating said trigger pulses;
   means defining a first DC voltage source operable with said horizontal output stage for energizing said means for generating said trigger pulses;
   energy storage means defining a second DC voltage source for energizing said means for generating said trigger pulses for a period of time after said horizontal output stage is deactivated; and,
   means defining a charging path for said energy storage means for a period of time after said horizontal output stage is activated.

32. The system of claim 31, comprising a capacitor and a resistor defining a timing network for said means for generating said trigger pulses, said capacitor forming said energy storage means.

33. The system of claim 32, wherein said means defining a charging path for said energy storage means comprises a Zener diode in parallel with said resistor.

* * * * *